United States Patent
Gruber

(10) Patent No.: US 10,953,721 B2
(45) Date of Patent: Mar. 23, 2021

(54) ELECTRIFIED VEHICLE WITH CLIMATE CONTROLLED FRONT TRUNK AND CORRESPONDING METHOD

(71) Applicant: Ford Global Technologies, LLC, Dearborn, MI (US)

(72) Inventor: Jordan Gruber, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 16/150,310

(22) Filed: Oct. 3, 2018

(65) Prior Publication Data

US 2020/0108688 A1 Apr. 9, 2020

(51) Int. Cl.
*B60H 1/00* (2006.01)
*B60R 7/02* (2006.01)
*B60N 3/10* (2006.01)

(52) U.S. Cl.
CPC ..... *B60H 1/00278* (2013.01); *B60H 1/00207* (2013.01); *B60H 1/00428* (2013.01); *B60H 1/00485* (2013.01); *B60H 1/00592* (2013.01); *B60N 3/104* (2013.01); *B60R 7/02* (2013.01)

(58) Field of Classification Search
CPC ............ B60H 1/00278; B60H 1/00207; B60H 1/00428; B60H 1/00592; B60H 1/00485; B60N 3/104; B60R 7/02
USPC ....................................................... 62/259.2
See application file for complete search history.

(56) References Cited

U.S. PATENT DOCUMENTS

| 3,850,006 A | 11/1974 | Redfern et al. |
| 4,759,190 A | 7/1988 | Trachtenberg et al. |
| 4,765,151 A | 8/1988 | Bessey |
| 6,997,004 B1 | 2/2006 | Pittman |
| 2010/0100266 A1* | 4/2010 | Yoshinori ......... H01M 8/04701 701/22 |
| 2016/0257181 A1* | 9/2016 | Zhou .................. B60H 1/32014 |
| 2018/0251008 A1* | 9/2018 | Androulakis ...... B60H 1/00295 |

FOREIGN PATENT DOCUMENTS

| DE | 102012204160 A1 | 9/2013 |
| JP | 2005094928 A * | 4/2005 |

OTHER PUBLICATIONS

Sugimoto, Tomonaga, Cooling Control Unit for Battery for Vehicle, Apr. 2005, European Patent Office, English Translation (Year: 2005).*
Teslarati Network, "Tesla Model S Front Trunk (Frunk) Electric Cooler Review," https://www.teslarati.com/tesla-model-s-front-trunk-frunk-cooler/ Posted on Jan. 31, 2014.

* cited by examiner

Primary Examiner — Steve S Tanenbaum
(74) Attorney, Agent, or Firm — David B. Kelley; Carlson, Gaskey & Olds, P.C.

(57) ABSTRACT

This disclosure relates to an electrified vehicle with a climate controlled front trunk and a corresponding method. An example electrified vehicle includes a thermal management system configured to circulate fluid to thermally condition a battery, a front trunk, and a valve configured to selectively permit fluid from the thermal management system to thermally condition the front trunk.

13 Claims, 6 Drawing Sheets

ELECTRIFIED VEHICLE WITH CLIMATE CONTROLLED FRONT TRUNK AND CORRESPONDING METHOD

TECHNICAL FIELD

This disclosure relates to an electrified vehicle with a climate controlled front trunk and a corresponding method.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

With the onset of electrified vehicles in the automotive market, many existing components in the engine compartment will become unnecessary. The excess room made available by the removal of these component allows for a front storage compartment, which is also known as a front trunk and sometimes shortened to "frunk." Front trunks are cargo areas located in the front of a vehicle and are typically accessible by opening the hood of the vehicle.

SUMMARY

An electrified vehicle according to an exemplary aspect of the present disclosure includes, among other things, a thermal management system configured to circulate fluid to thermally condition a battery, a front trunk, and a valve configured to selectively permit fluid from the thermal management system to thermally condition the front trunk.

In a further non-limiting embodiment of the foregoing electrified vehicle, the valve is in fluid communication with the thermal management system, and the valve is responsive to instructions from a controller to selectively permit fluid to thermally condition the front trunk.

In a further non-limiting embodiment of any of the foregoing electrified vehicles, a sensor is mounted adjacent the front trunk and is configured to generate a signal indicative of a temperature of the front trunk. Further, the controller is configured to send instructions to the valve based on the signal from the sensor.

In a further non-limiting embodiment of any of the foregoing electrified vehicles, the controller is configured to send instructions to the valve to maintain a target temperature range of the front trunk.

In a further non-limiting embodiment of any of the foregoing electrified vehicles, the front trunk includes a housing and a thermal management feature, and the valve is arranged such that fluid flowing through the valve flows to the thermal management feature.

In a further non-limiting embodiment of any of the foregoing electrified vehicles, the thermal management feature is a thermal exchange plate.

In a further non-limiting embodiment of any of the foregoing electrified vehicles, the thermal management feature is a thermal exchange jacket.

In a further non-limiting embodiment of any of the foregoing electrified vehicles, the thermal management system includes at least one of a battery cooling loop and a battery heating loop, and the valve is in fluid communication with the at least one of the cooling loop and the heating loop.

In a further non-limiting embodiment of any of the foregoing electrified vehicles, the thermal management system includes a bypass valve responsive to instructions from the controller, the bypass valve is configured to selectively direct fluid such that the fluid flowing within the thermal management system bypasses the battery.

In a further non-limiting embodiment of any of the foregoing electrified vehicles, the thermal management system includes a battery cooling loop having a chiller and a pump configured to circulate fluid to cool the battery, and the valve is in fluid communication with the thermal management system at a location downstream of the chiller and the pump.

In a further non-limiting embodiment of any of the foregoing electrified vehicles, the thermal management system includes a battery heating loop having a heater and a pump configured to circulate fluid to heat the battery, and the valve is in fluid communication with the thermal management system at a location downstream of the heater and the pump.

In a further non-limiting embodiment of any of the foregoing electrified vehicles, the front trunk is located in a front of the electrified vehicle.

In a further non-limiting embodiment of any of the foregoing electrified vehicles, the front trunk is accessible by opening a front hood of the electrified vehicle.

A method according to an exemplary aspect of the present disclosure includes, among other things, thermally conditioning a front trunk with fluid from a thermal management system for a battery of an electrified vehicle.

In a further non-limiting embodiment of the foregoing method, the step of thermally conditioning the front trunk includes directing fluid from one of a battery cooling loop and a battery heating loop toward the front trunk.

In a further non-limiting embodiment of any of the foregoing methods, the step of thermally conditioning the front trunk includes directing fluid to a thermal exchange feature of the front trunk.

In a further non-limiting embodiment of any of the foregoing methods, the thermal exchange feature is one of a thermal exchange plate and a thermal exchange jacket.

In a further non-limiting embodiment of any of the foregoing methods, a valve in fluid communication with the battery cooling loop and the battery heating loop is selectively opened to permit fluid flow to the front trunk.

In a further non-limiting embodiment of any of the foregoing methods, the valve is controlled to maintain a target temperature of the front trunk.

In a further non-limiting embodiment of any of the foregoing methods, the front trunk is located in a front of the electrified vehicle and is accessed by opening a front hood of the electrified vehicle.

DETAILED DESCRIPTION

This disclosure relates to an electrified vehicle with a climate controlled front trunk and a corresponding method. An example electrified vehicle includes a thermal management system configured to circulate fluid to thermally condition a battery, a front trunk, and a valve configured to selectively permit fluid from the thermal management system to thermally condition the front trunk. This disclosure makes substantial use of existing electrified vehicle hardware, and is thus relatively easily implemented. Further, because the front trunk may be selectively heated and cooled, the front trunk is particularly suited for transporting hot or cold food items. These and other benefits will be appreciated from the following description.

Figure 1:
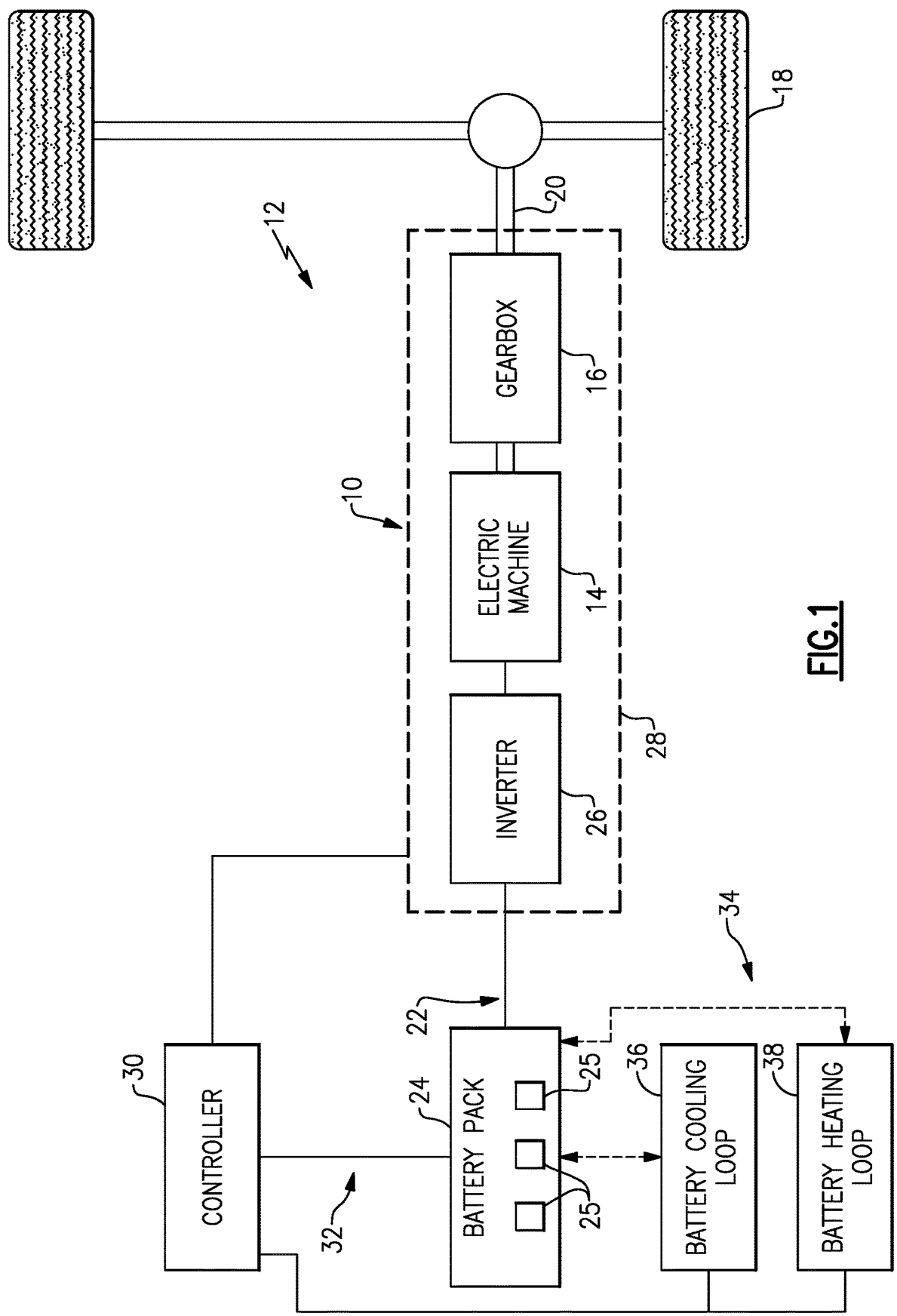
FIG. 1 schematically illustrates a powertrain of an electrified vehicle.

Referring now to the figures, FIG. 1 schematically illustrates a powertrain 10 of an electrified vehicle 12, which is shown as a battery electric vehicle (BEV). Although depicted as a BEV, it should be understood that the concepts described herein are not limited to BEVs and could extend to other electrified vehicles, including but not limited to, plug-in hybrid electric vehicles (PHEVs). Therefore, although not shown in this embodiment, the electrified vehicle 12 could be equipped with an internal combustion engine that can be employed either alone or in combination with other energy sources to propel the electrified vehicle 12. Further, this disclosure extends to any hybrid or electric vehicle including full hybrids, parallel hybrids, series hybrids, mild hybrids, and micro hybrids, among others.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 may be provided by a permanent magnet synchronous motor, although other motors may be used. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 (i.e., a "battery") through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., groupings of battery cells commonly known as arrays) capable of outputting electrical power to operate the electric machine 14 and/or other electrical loads of the electrified vehicle 12. Other types of energy storage devices and/or output devices can also be used to electrically power the electrified vehicle 12. The electrified vehicle 12 may also include a charging system for periodically charging energy storage devices (e.g., battery cells) of the battery pack 24. The charging system may be connected to an external power source, such as a grid power source, for receiving and distributing power to the energy storage devices.

The inverter 26 may be an electronic device including IGBTs (insulated-gate bipolar transistors) or other switches adapted to convert direct current (DC) from the battery pack 24 to alternating current (AC). In response to instructions from a controller 30, the inverter 26 may activate one or more of its switches to convert direct current from the battery pack 24 to alternating current for the electric machine 14. Based on a desired torque output, the controller 30 sends one or more instructions to the inverter 26, which in turn is operable to direct an appropriate voltage and frequency of AC current from the battery pack 24 to the electric machine 14.

In addition to communicating with the inverter 26, the controller 30 is configured to monitor and/or control various aspects of the powertrain 10 associated with the electrified vehicle 12. The controller 30, for example, may communicate with the electric machine 14, the battery pack 24, and the inverter 26. The controller 30 may also communicate with various other vehicle components and monitor other vehicle conditions. The controller 30 includes electronics, software, or both, to perform the necessary control functions for operating the electrified vehicle 12.

In one non-limiting embodiment, the controller 30 is a combination vehicle system controller and powertrain control module (VSC/PCM). Although it is shown as a single device, the controller 30 may include multiple controllers in the form of multiple hardware devices, or multiple software controllers with one or more hardware devices. A controller area network 32 (CAN) allows the controller 30 to communicate with the various components of the electrified vehicle 12.

In this example, the battery 24 is thermally conditioned by a thermal management system 34, which includes one or both of a battery cooling loop 36 and a battery heating loop 38, which are in electronic communication with the controller 30, and are configured to cool and heat the battery 24, respectively. The dashed lines in FIG. 1 indicate, schematically, that the battery cooling loop 36 and battery heating loop 38 direct fluid, such as a working fluid like refrigerant, to the battery 24 to thermally manage the battery 24. The working fluid may manage the temperature of the battery 24 by flowing through a thermal exchange plate adjacent the battery 24, in one example. In this disclosure, the working fluid in the thermal management system 34 may also be used to thermally condition a front trunk. The battery cooling and heating loops 36, 38 will be discussed in more detail below.

The powertrain 10 shown in FIG. 1 is highly schematic and is not intended to limit this disclosure. Various additional components could alternatively or additionally be employed by the powertrain 10 within the scope of this disclosure.

Figure 2:
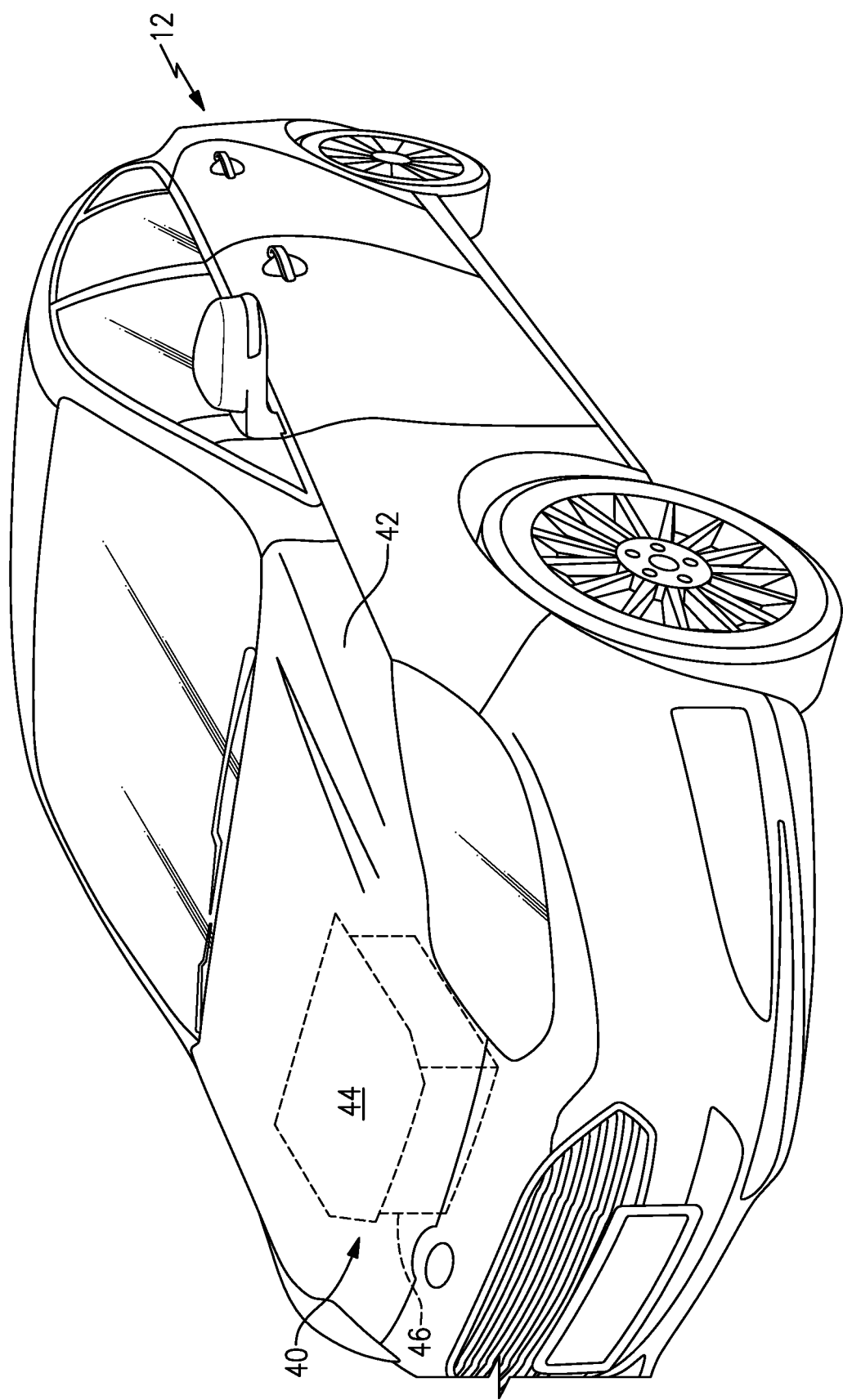
FIG. 2 is a perspective view of an example vehicle, and illustrates the general location of an example front trunk in phantom.

FIG. 2 illustrates an example electrified vehicle 12. In FIG. 2, the electrified vehicle 12 includes a front storage compartment, which is referred to herein is a front trunk 40, that is covered by a front hood 42. The front trunk 40 may be referred to more broadly as a front storage compartment or by the portmanteau "frunk."

The front hood 42 is a hinged cover which, when closed, covers the front trunk 40 and/or various other components arranged in the front of the electrified vehicle 12. In this example, interior compartment 44 of the front trunk 40 is defined partially by a housing 46.

Figure 3A:
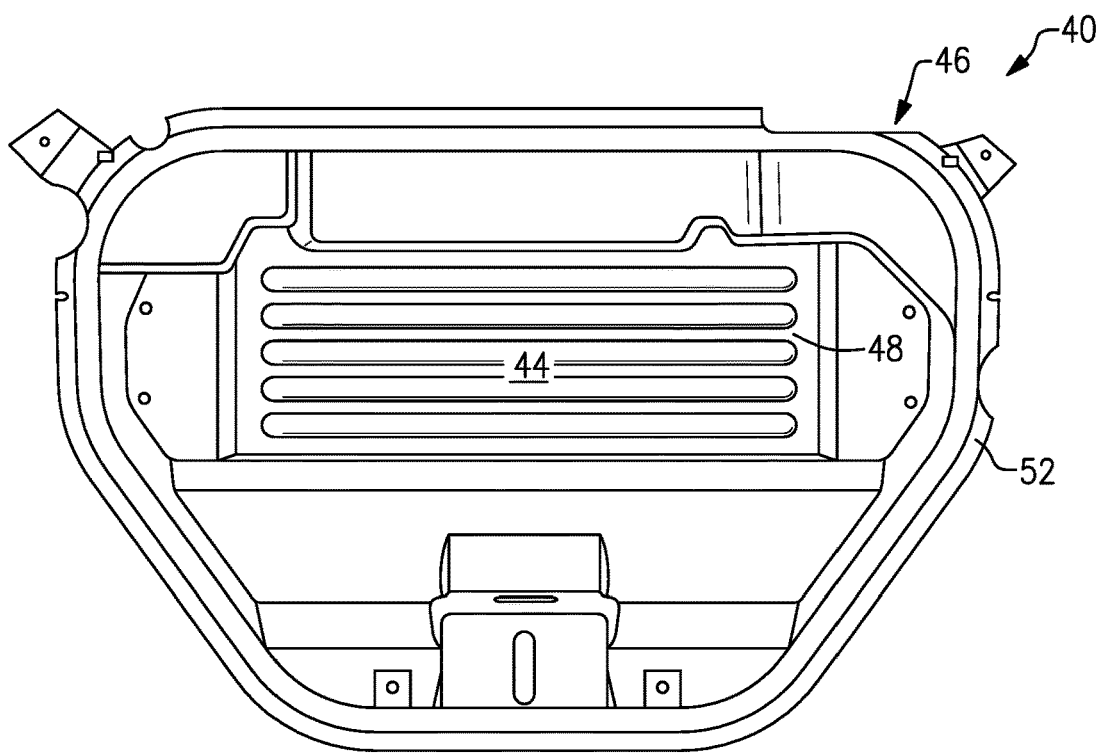
FIG. 3A is a top view of an example front trunk.
Figure 3B:
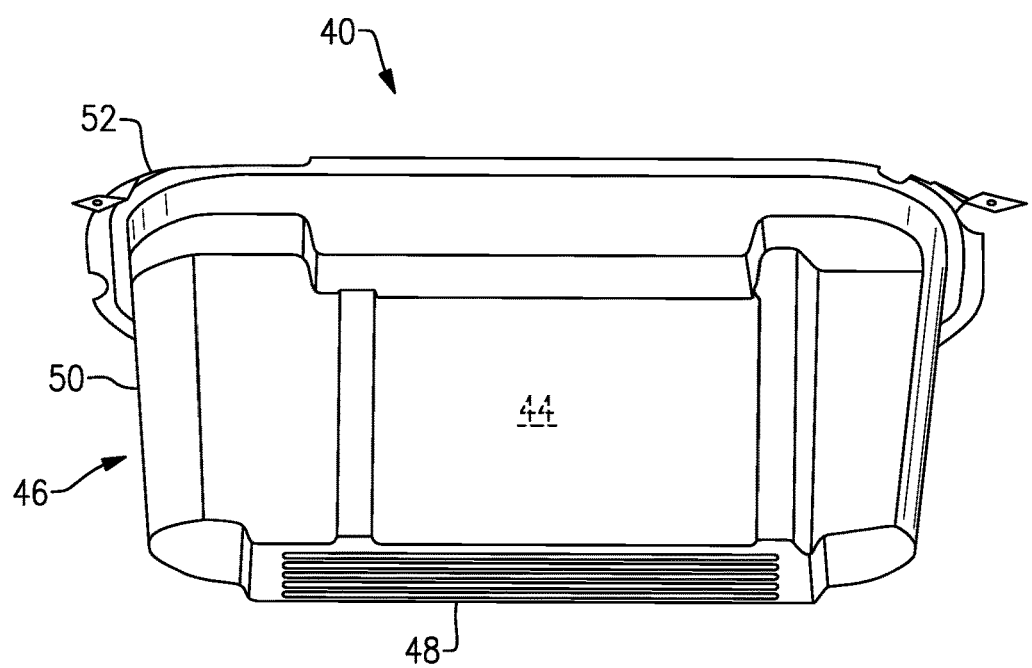
FIG. 3B is a rear view of the example front trunk.

FIGS. 3A and 3B illustrate an example housing 46 in detail. FIG. 3A is a top view of the housing 46, and FIG. 3B is a rear view of the housing 46. The housing 46 in this example includes a base 48 and a side wall 50 projecting upward from the base 48. A perimeter lip 52 projects laterally from the top of the side wall 50. The perimeter lip 52 extends around the entirety of the housing 46. The perimeter lip 52 may be secured to the electrified vehicle 12 by way of fasteners, for example. Together with the front hood 42, the housing 46 is configured to enclose the interior compartment 44.

The housing 46 is made of a single, integral piece of material in this example. The housing 46 may be made of a polymer material and formed by injection molding or thermoforming, as examples. The housing 46 may also be made of a metallic material and formed by stamping. The housing 46 may be made of an insulated material in one example. This disclosure is not limited to any particular material type or manufacturing technique.

In addition to the housing 46, the front trunk 40 includes a thermal management feature. The thermal management feature is configured to control the climate of the front trunk 40. In particular, the thermal management feature is configured to interact with a working fluid, thereby exposing the front trunk 40 to the working fluid. The working fluid is configured to absorb heat from the front trunk 40, or vice versa, in order to control the climate of the front trunk 40.

Figure 4A:
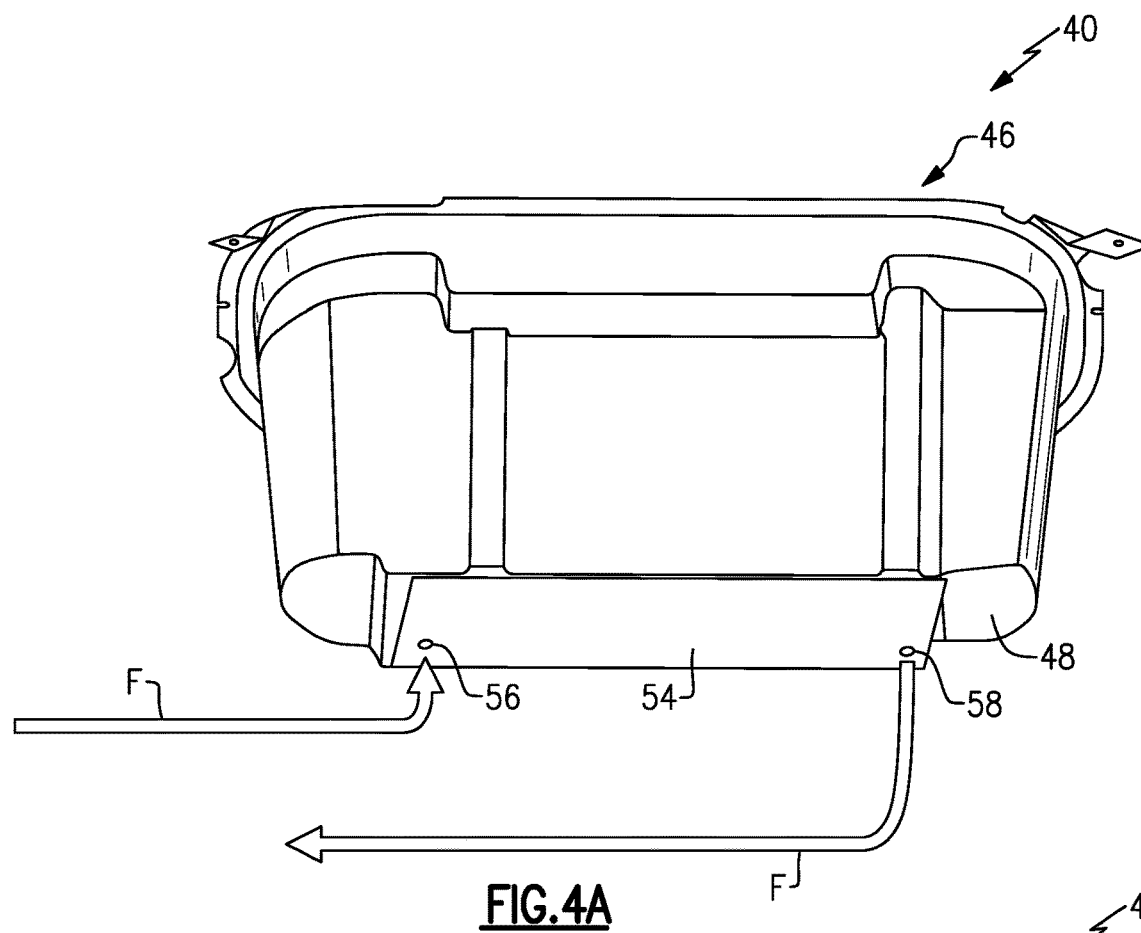
FIG. 4A illustrates the example front trunk and a thermal exchange plate.
Figure 4B:
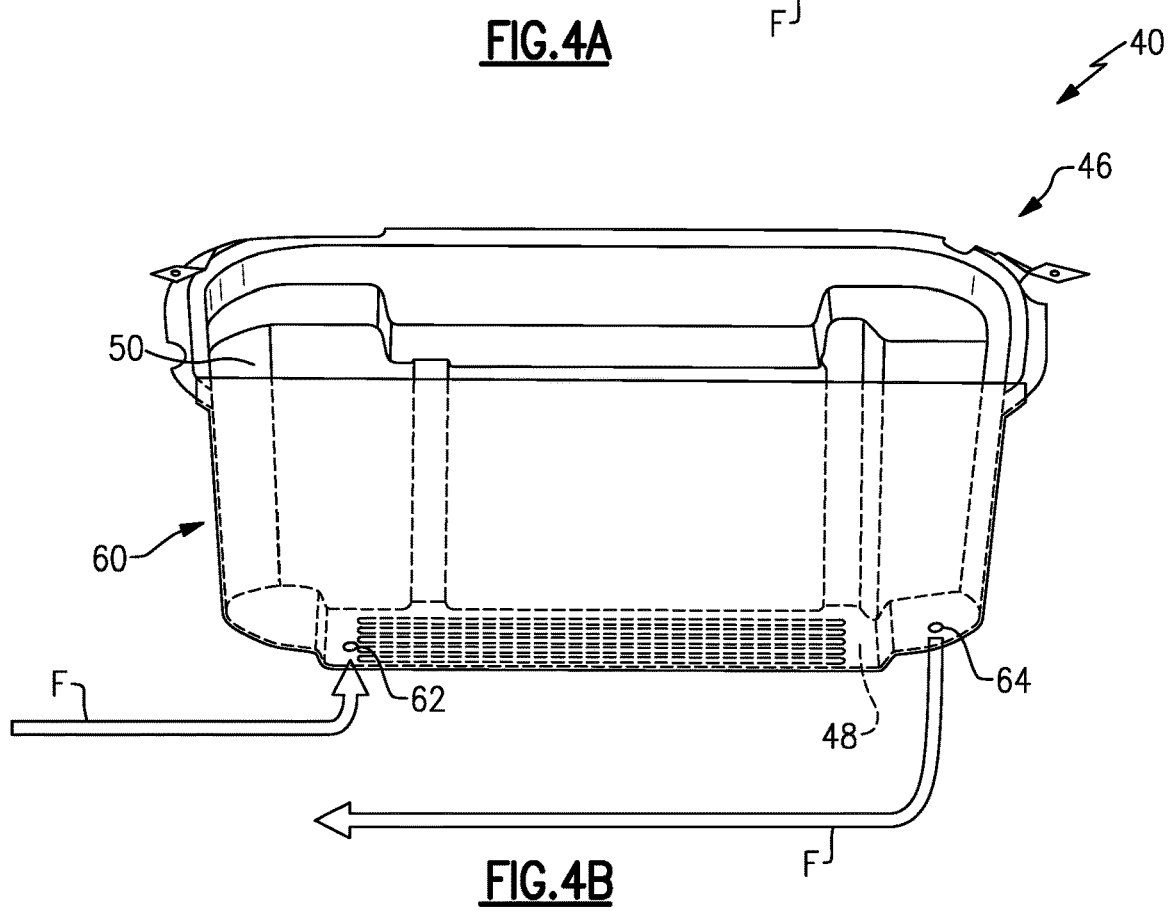
FIG. 4B illustrates the example front trunk and a thermal exchange jacket.

FIGS. 4A and 4B schematically illustrate two example thermal management features. In FIG. 4A, the thermal management feature is thermal exchange plate 54 mounted adjacent the base 48 of the housing 46. Thermal exchange plates are often referred to as "cold plates" or "hot plates," however in this disclosure the thermal exchange plate may function as either a cold plate or a hot plate. The thermal exchange plate 54 is separate and distinct from the thermal exchange plate associated with the battery 24.

In this example, the thermal exchange plate 54 is mounted beneath, and on the exterior of, the housing 46. The thermal exchange plate 54 may be mounted adjacent other portions of the housing 46 in other examples. Further, while the housing 46 and thermal exchange plate 54 are separate components in this example, the thermal exchange plate 54 may be formed integrally with the housing 46 in other examples.

The thermal exchange plate 54 includes an inlet port 56, an outlet port 58, and one or more internal passageways. Working fluid F may be selectively directed into the thermal exchange plate 54, as will be discussed below, in order to thermally condition the front trunk 40. Specifically, as working fluid F flows through the thermal exchange plate 54, the working fluid F absorbs heat from the interior compartment 44, or vice versa.

In FIG. 4B, the thermal management feature is a thermal exchange jacket 60 that surrounds the base 48 and partially surrounds the side wall 50. As with the thermal exchange plate 54, the thermal exchange jacket 60 includes an inlet port 62, an outlet port 64, and one or more internal passageways. Working fluid F is selectively directed into the thermal exchange jacket 60. Specifically, as working fluid F flows through the thermal exchange jacket 60, the working fluid F absorbs heat from the interior compartment 44, or vice versa. The thermal exchange jacket 60, in this example, is mounted on the exterior of the housing 46. In other examples, the thermal exchange jacket 60 may be formed integrally with the housing 46.

While both the thermal exchange plate 54 and the thermal exchange jacket 60 provide effective heat transfer, the thermal exchange jacket 60 covers a greater surface area of the front trunk 40, and thus may transfer heat more efficiently. This disclosure is not limited to thermal exchange plates or thermal exchange jackets, and extends to other types of thermal exchange features.

Figure 5:
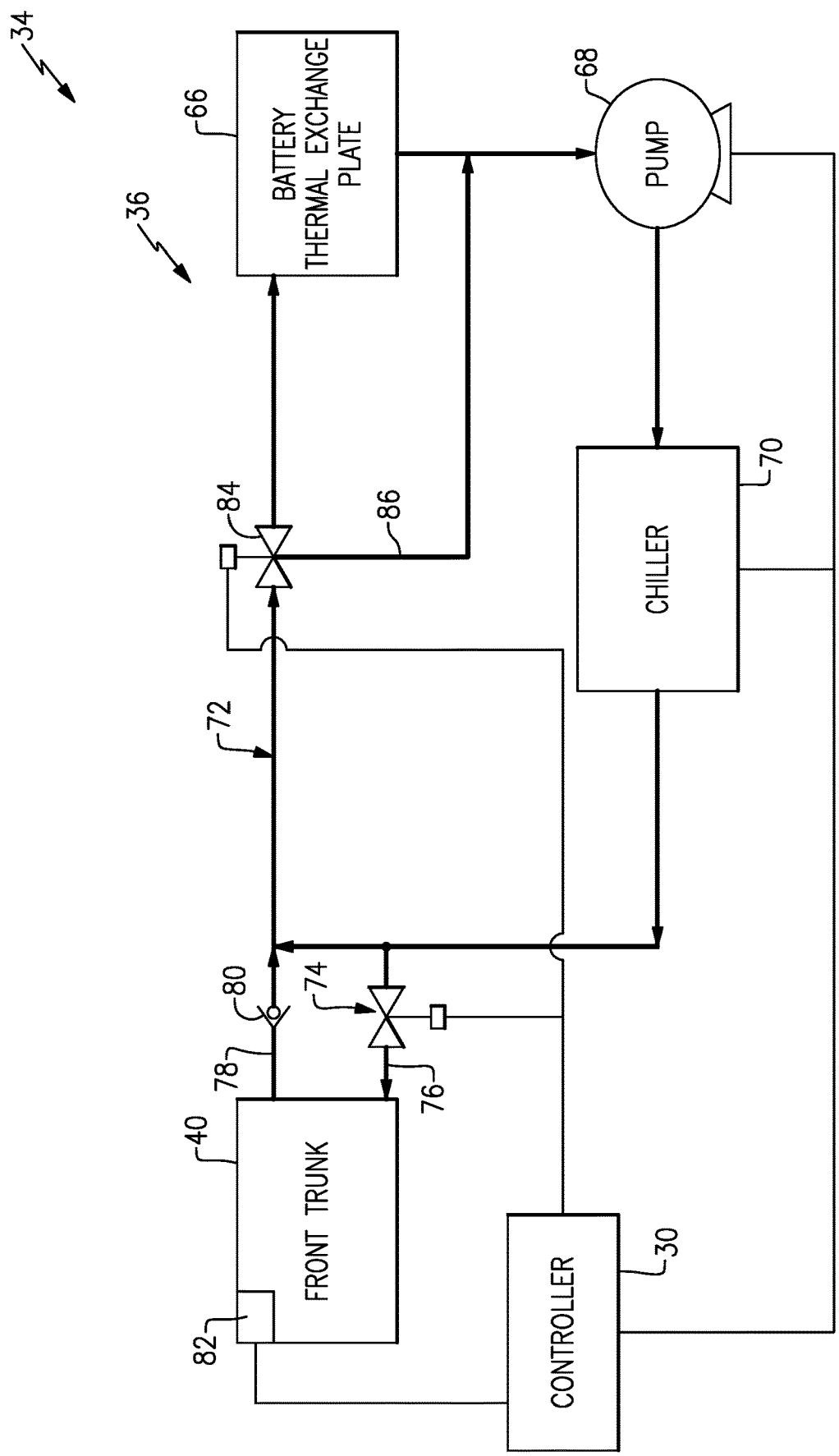
FIG. 5 schematically illustrates an example arrangement of the front trunk relative to a battery cooling loop.
Figure 6:
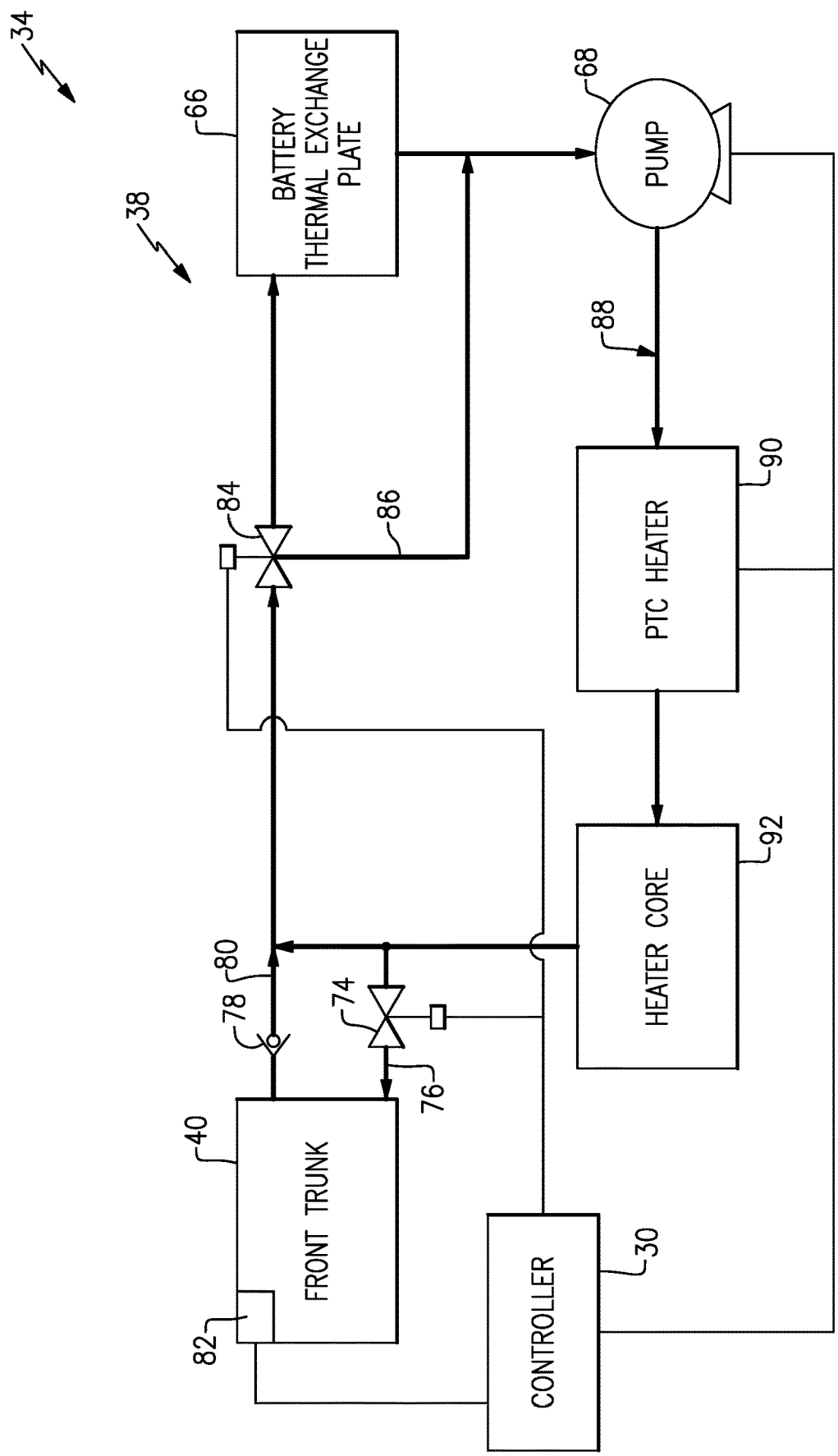
FIG. 6 schematically illustrates an example arrangement of the front trunk relative to a battery heating loop.

FIGS. 5 and 6 are schematic illustrations of an example arrangement of the front trunk 40 relative to the thermal management system 34. In general, the thermal management system 34 is configured to circulate fluid, such as a working fluid like refrigerant, to thermally condition the battery 24. In FIGS. 5 and 6, the lines through which working fluid may flow are relatively thick, whereas lines representing electrical connections are relatively thin. FIG. 5 schematically illustrates a first aspect of the thermal management system 34, which is a battery cooling loop 36, and FIG. 6 schematically illustrates a second aspect of the thermal management system 34, which is a battery heating loop 38.

The controller 30 may receive information from one or more sensors, for example, indicative of various operating conditions of the electrified vehicle 12 and/or the battery 24, and may selectively activate one of the battery cooling or heating loops 36, 38 to selectively cool or heat the battery 24, respectively. Further, the controller 30 may also receive information pertaining to the temperature of the front trunk 40, and may selectively activate one of the battery cooling or heating loops 36, 38 in order to effect a temperature change of the front trunk 40. An example control scheme will be described below with reference to FIGS. 5 and 6.

In general, many components of the battery cooling and heating loops 36, 38 are arranged adjacent the front of the electrified vehicle 12. In this example, components such as conduits, valves, couplings, etc., are arranged adjacent the front trunk 40. As such, the front trunk 40 is readily thermally conditioned with the same working fluid circulating within the battery cooling and heating loops 36, 38.

With reference to FIG. 5, the example battery cooling loop 36 is fluidly coupled to a battery thermal exchange plate 66, which is mounted adjacent the battery 24. When the battery cooling loop 36 is activated, the working fluid within the battery cooling loop 36 is configured to absorb heat from the battery 24. The battery cooling loop 36 includes a pump 68 downstream of the battery thermal exchange plate 66, and a chiller 70 downstream of the pump 68. The pump 68 is configured to pressurize a flow of working fluid and direct that working fluid through the battery cooling loop 36 along a main flow path 72, which includes the battery thermal exchange plate 66, the pump 68, and the chiller 70. In one example the chiller 70 interacts with another flow of fluid to cool the working fluid in the battery cooling circuit 36.

In this example, the battery cooling loop 36 includes a valve 74 configured to selectively permit working fluid from the thermal management system 34 to thermally condition the front trunk 40. In particular, in this example, the valve 74 is located in a first passageway 76 between the front trunk 40 and the main flow path 72. The valve 74 is responsive to instructions from the controller 30 to selectively permit fluid to flow to the front trunk 40. In particular, the controller 30 is configured to instruct the valve 74 is open, either partially or fully, in order to essentially tap a portion of the working fluid flowing within the main flow path 72 such that the portion flows through the first passageway 76 to the thermal management feature of the front trunk 40. Again, the thermal management feature may be a thermal exchange plate or a thermal jacket. Downstream of the front trunk 40, the tapped fluid flows back to the main flow path 72 via a second passageway 78. The second passageway 78 may include a check, or one-way, valve 80 configured to prevent backflow from the main flow path 72.

The controller 30 may be configured to selectively open, either fully or partially, the valve 74 based on information from a sensor 82 mounted adjacent the front trunk 40. The sensor 82 may be mounted on the exterior of the housing 46 or in the interior compartment 44, as examples. The controller 30 is configured to send instructions to the valve 74 based on the signal from the sensor 82. Further, the controller 30 is configured to selectively activate one of the battery cooling loop and the battery heating loop based on the signal from the sensor 82.

For instance, a user may desire to cool the contents of the front trunk 40, and to keep the interior compartment 44 at a temperature below a certain target temperature. In this example, the controller 30 is configured to selectively activate the battery cooling loop 36 and open the valve 74 if the interior compartment 44 rises above the target temperature. Alternatively, the user may set a target temperature range, and the controller 30 is configured to selectively activate the battery cooling loop 36 and open the valve 74 if the interior compartment 44 rises above the target temperature range. The user may set the target temperature or target temperature range via the dash and/or the instrument cluster of the vehicle, and specifically via a human-machine-interface.

In certain situations, however, the demands of the front trunk 40 may differ from those of the battery 24. In particular, in some examples, the front trunk 40 may demand cooling while the battery 24 requires heating. In such situations, it is desirable to cool the front trunk 40 while avoiding cooling the battery 24. In order to achieve this, the battery cooling loop 36 may include a bypass valve 84 and a bypass line 86. The bypass valve 84 is located downstream of the second passageway 78 and upstream of the battery thermal exchange plate 66. The bypass valve 84 may be selectively opened and closed in response to instructions from the controller 30. When the bypass valve 84 is opened, fluid flows directly to the pump 68 through the bypass line 86 and bypasses the battery thermal exchange plate 66. In this way, the working fluid does not influence the temperature of the battery 24 when the bypass valve 84 is opened.

The bypass valve 84 and bypass line 86 are not required in all examples. Further, while the climate demands of the front trunk 40 and the battery 24 may differ, the front trunk 40 is a relatively small and well-insulated space. Thus, temperature changes of the front trunk 40 may be effected relatively quickly, whereas it may take a relatively longer time to effect a change in the temperature of the battery 24. Accordingly, the bypass valve 84 may only be used for a relatively small period of time, and, if a bypass valve 84 is not present, the temperature of the battery 24 may be effected very little, if at all, by running in a mode opposite its desired mode (e.g., the battery cooling loop 36 is activated when the battery 24 desires heating).

With reference to FIG. 6, the example battery heating loop 38 includes the battery thermal exchange plate 66, which, again, is mounted adjacent the battery 24. When the battery heating loop 38 is activated, the battery 24 is configured to absorb heat from the working fluid within the battery heating loop 38.

The battery heating loop 38 may share components with the battery cooling loop 36. For instance, the battery cooling and heating loops 36, 38 are both in fluid communication with the battery thermal exchange plate 66, and the pump 68 may be common between the two loops. The battery heating loop 38 includes a main flow path 88 through which working fluid flows. The main flow path 88 includes the battery thermal exchange plate 66, the pump 68, a heater 90, which in this example is a positive temperature coefficient (PTC) heater, and a heater core 92. The heater 90 is configured to heat the working fluid within the main flow path 88. The heater 90 is downstream of the pump 68, and the heater core 92 is downstream of the heater 90. The heater core 92 may be used to heat a cabin of the electrified vehicle 12. Downstream of the heater core 92, working fluid in the main flow path 88 flows back to the battery thermal exchange plate 66.

The first and second passageways 76, 78 are in fluid communication with the main flow path 88 in substantially the same way as with the main flow path 72. When the battery heating loop 38 is active, the controller 30 can instruct the valve 74 to open to allow relatively hot working fluid to flow to the thermal management feature of the front trunk 40, thereby heating the front trunk 40. Downstream of the thermal management feature of the front trunk 40, flow returns to the flow path 88 via the second passageway 80.

In use, a user may desire to heat the contents of the front trunk 40, and to keep the interior compartment 44 at or above a certain target temperature. In this example, the controller 30 is configured to selectively activate the battery heating loop 38 and open the valve 74 if the interior compartment 44 rises above the target temperature. As in the example of FIG. 5, the bypass valve 84 may be opened to direct flow through the bypass line 86 if heating of the battery 24 is not desired. If present, the bypass valve 84 and bypass line 86 may be common between the battery cooling and heating loops 36, 38.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
   a thermal management system configured to circulate fluid to thermally condition a battery;
   a front trunk; and
   a valve configured to selectively permit fluid from the thermal management system to thermally condition the front trunk,
   wherein the valve is in fluid communication with the thermal management system,
   wherein the valve is responsive to instructions from a controller to selectively permit fluid to thermally condition the front trunk,
   wherein the front trunk includes a housing and one of a thermal exchange plate and a thermal exchange jacket, and wherein the valve is arranged such that fluid flowing through the valve flows to the one of the thermal exchange plate and the thermal exchange jacket.

2. The electrified vehicle as recited in claim 1, further comprising:
a sensor mounted adjacent the front trunk and configured to generate a signal indicative of a temperature of the front trunk, wherein the controller is configured to send instructions to the valve based on the signal from the sensor.

3. The electrified vehicle as recited in claim 2, wherein the controller is configured to send instructions to the valve to maintain a target temperature range of the front trunk.

4. The electrified vehicle as recited in claim 1, wherein:
the thermal management system includes at least one of a battery cooling loop and a battery heating loop, and
the valve is in fluid communication with the at least one of the battery cooling loop and the battery heating loop.

5. The electrified vehicle as recited in claim 4, wherein:
the thermal management system includes a battery cooling loop having a chiller and a pump configured to circulate fluid to cool the battery, and
the valve is in fluid communication with the thermal management system at a location downstream of the chiller and the pump.

6. The electrified vehicle as recited in claim 4, wherein:
the thermal management system includes a battery heating loop having a heater and a pump configured to circulate fluid to heat the battery, and
the valve is in fluid communication with the thermal management system at a location downstream of the heater and the pump.

7. The electrified vehicle as recited in claim 1, wherein the front trunk is located in a front of the electrified vehicle.

8. The electrified vehicle as recited in claim 7, wherein the front trunk is accessible by opening a front hood of the electrified vehicle.

9. An electrified vehicle, comprising:
a thermal management system configured to circulate fluid to thermally condition a battery;
a front trunk; and
a valve configured to selectively permit fluid from the thermal management system to thermally condition the front trunk,
wherein the valve is in fluid communication with the thermal management system,
wherein the valve is responsive to instructions from a controller to selectively permit fluid to thermally condition the front trunk,
wherein the thermal management system includes at least one of a battery cooling loop and a battery heating loop,
wherein the valve is in fluid communication with the at least one of the battery cooling loop and the battery heating loop,
wherein the thermal management system includes a bypass valve responsive to instructions from the controller, and
wherein the bypass valve is configured to selectively direct fluid such that the fluid flowing within the thermal management system bypasses the battery.

10. A method, comprising:
thermally conditioning a front trunk with fluid from a thermal management system for a battery of an electrified vehicle by directing fluid from one of a battery cooling loop and a battery heating loop to one of a thermal exchange plate and a thermal exchange jacket.

11. The method as recited in claim 10, wherein the front trunk is located in a front of the electrified vehicle and is accessed by opening a front hood of the electrified vehicle.

12. The method as recited in claim 10, wherein a valve in fluid communication with the battery cooling loop and the battery heating loop is selectively opened to permit fluid flow to the one of the thermal exchange plate and the thermal exchange jacket.

13. The method as recited in claim 12, wherein the valve is controlled to maintain a target temperature of the front trunk.

* * * * *